US008360626B2

(12) United States Patent
Tsukamoto

(10) Patent No.: US 8,360,626 B2
(45) Date of Patent: Jan. 29, 2013

(54) VEHICLE HEADLAMP LAMP UNIT HAVING PLURALITYOF SHADES

(75) Inventor: Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 246 days.

(21) Appl. No.: 12/882,427

(22) Filed: Sep. 15, 2010

(65) Prior Publication Data

US 2011/0063868 A1 Mar. 17, 2011

(30) Foreign Application Priority Data

Sep. 16, 2009 (JP) ................................. 2009-214312

(51) Int. Cl.
*B60Q 1/04* (2006.01)

(52) U.S. Cl. ........ 362/539; 362/507; 362/516; 362/307; 362/343

(58) Field of Classification Search .................. 362/507, 362/516, 538, 539, 296.01, 307, 341, 343
See application file for complete search history.

(56) References Cited

U.S. PATENT DOCUMENTS

| | | | | |
|---|---|---|---|---|
| 1,951,783 | A * | 3/1934 | Beard | 362/365 |
| 6,948,836 | B2 * | 9/2005 | Ishida et al. | 362/545 |
| 7,832,912 | B2 * | 11/2010 | Nishihata | 362/539 |
| 8,210,727 | B2 * | 7/2012 | Suzuki | 362/539 |
| 2005/0141235 | A1 * | 6/2005 | Takeda et al. | 362/545 |
| 2006/0285341 | A1 | 12/2006 | Yatsuda et al. | |
| 2007/0268717 | A1 * | 11/2007 | Iwasaki | 362/539 |
| 2010/0110716 | A1 * | 5/2010 | Nakada | 362/538 |
| 2011/0199777 | A1 * | 8/2011 | Naganawa | 362/539 |

FOREIGN PATENT DOCUMENTS

| | | | |
|---|---|---|---|
| CN | 101275729 | A | 10/2008 |
| EP | 1544536 | A2 | 6/2005 |
| GB | 2370104 | A | 6/2002 |
| JP | 2003-317513 | A | 11/2003 |
| JP | 2005347128 | A | 12/2005 |

OTHER PUBLICATIONS

Extended European Search Report issued on Jan. 4, 2011 in the corresponding European Patent Application No. 10175952.0.
Chinese Office Action dated Feb. 22, 2012 issued by the State Intellectual Property of P.R. China in counterpart Chinese Patent Application No. 201010287100.9.

* cited by examiner

*Primary Examiner* — Ismael Negron
(74) *Attorney, Agent, or Firm* — Sughrue Mion, PLLC

(57) ABSTRACT

A lamp unit includes a projection lens, a light emitting device disposed such that a light emitting axis of the light emitting device is oriented upward, a reflector disposed to cover light emitted from the light emitting device and to reflect the light toward the projection lens, a first shade configured and disposed to partially block the light reflected by the reflector, and a second shade. The first shade includes a light cutting edge configured to form a cutoff line along an upper edge of a light distribution pattern, and an auxiliary reflecting surface extending rearward from the light cutting edge and configured to partially reflect, toward the projection lens, the light reflected by the reflector. The second shade is arranged to extend from a front edge of the reflector toward the auxiliary reflecting surface.

14 Claims, 5 Drawing Sheets

VEHICLE HEADLAMP LAMP UNIT HAVING PLURALITYOF SHADES

CROSS-REFERENCE TO RELATED APPLICATIONS

The present application claims priority from Japanese Patent Application No. 2009-214312 filed on Sep. 16, 2009, the entire content of which is incorporated herein by reference.

FIELD OF INVENTION

Apparatuses consistent with the present invention relate to a lamp unit for a vehicle headlamp and, more particularly, to a projector-type lamp unit having a light emitting device, such as a light emitting diode (LED), as a light source and configured to form a light distribution pattern having a cutoff line along its upper edge.

DESCRIPTION OF RELATED ART

FIG. 5 illustrates an example of a related art lamp unit (see, e.g., JP 2003-317513 A). The lamp unit includes a projection lens 2 disposed on an optical axis L extending in a front-rear direction of a vehicle, a light emitting device 4 disposed behind a rear focal point F of the projection lens 2 and on or near the optical axis L so as to be oriented upward, a reflector 6 disposed to cover the light emitting device 4 from above, i.e. to cover light emitted from the light emitting device 4 and to forwardly reflect the light toward the optical axis L, and a shade 8 disposed behind the projection lens 2 and configured to form a cutoff line of a light distribution pattern.

The reflector 6 is configured to have an elliptic vertical cross-section having a first focal point f1 and a second focal point f2. The projection lens 2, the light emitting device 4 and the reflector 6 are arranged such that the light emitting center of the light emitting device 4 is disposed on the first focal point f1 and the rear focal point F of the projection lens 2 coincides with the second focal point F2. The shade 8 is disposed such that a light cutting edge of the shade 8 is arranged near the rear focal point of the projection lens 2. An image on a rear focal plane of the projection lens 2 is forwardly projected as an inverted image, whereby a low beam light distribution pattern having a cutoff line along its upper edge is formed.

The shade 8 has an auxiliary light reflecting surface **8*a* extending rearward from the light cutting edge in a direction of the optical axis L direction. As illustrated by a broken line in FIG. 5, the auxiliary reflecting surface 8*a* reflects the light reflected by the reflector 6 toward the projection lens 2, so that the light emitted from the light emitting device 4 is efficiently used for forming the light distribution pattern. That is, light distribution quantity is increased by using the light reflected by the auxiliary reflecting surface 8*a*. In other words, illuminance of the light distribution pattern is increased by an amount equivalent to the light additionally provided by the auxiliary reflecting surface 8*a***.

On the other hand, a light emitting device having high luminous flux, such as a high intensity LED, may be used as a light source to increase the light distribution quantity, thereby improving visibility. More specifically, using a light emitting device having high luminous flux increases illuminance of the entire light distribution pattern and improves lateral visibility. However, a part of an irradiation region close to the vehicle may become excessively bright, and may relatively lower the visibility in a distant part of the irradiation region.

BRIEF SUMMARY

Illustrative aspects of the present invention provide a lamp unit for a vehicle headlamp. The lamp unit is configured to provide appropriate forward visibility in a region close to a vehicle as well as in a region distant from the vehicle.

According to an illustrative aspect of the present invention, a lamp unit includes a projection lens disposed on an optical axis extending in a front-rear direction of a vehicle, a light emitting device disposed behind a rear focal point of the projection lens such that a light emitting axis of the light emitting device is oriented upward, a reflector disposed to cover light emitted from the light emitting device and to reflect the light toward the projection lens, a first shade configured and disposed to partially block the light reflected by the reflector, and a second shade. The first shade includes a light cutting edge configured to form a cutoff line along an upper edge of a light distribution pattern, and an auxiliary reflecting surface extending rearward from the light cutting edge in a direction of the optical axis and configured to partially reflect, toward the projection lens, the light reflected by the reflector. The second shade is arranged to extend from a front edge of the reflector toward the auxiliary reflecting surface.

Other aspects and advantages of the invention will be apparent from the following description, the drawings and the claims.

DETAILED DESCRIPTION

Hereinafter, an exemplary embodiment of the present invention will be described in detail with reference to the drawings. However, the following exemplary embodiment does not limit the scope of the claimed invention.

Figure 1:
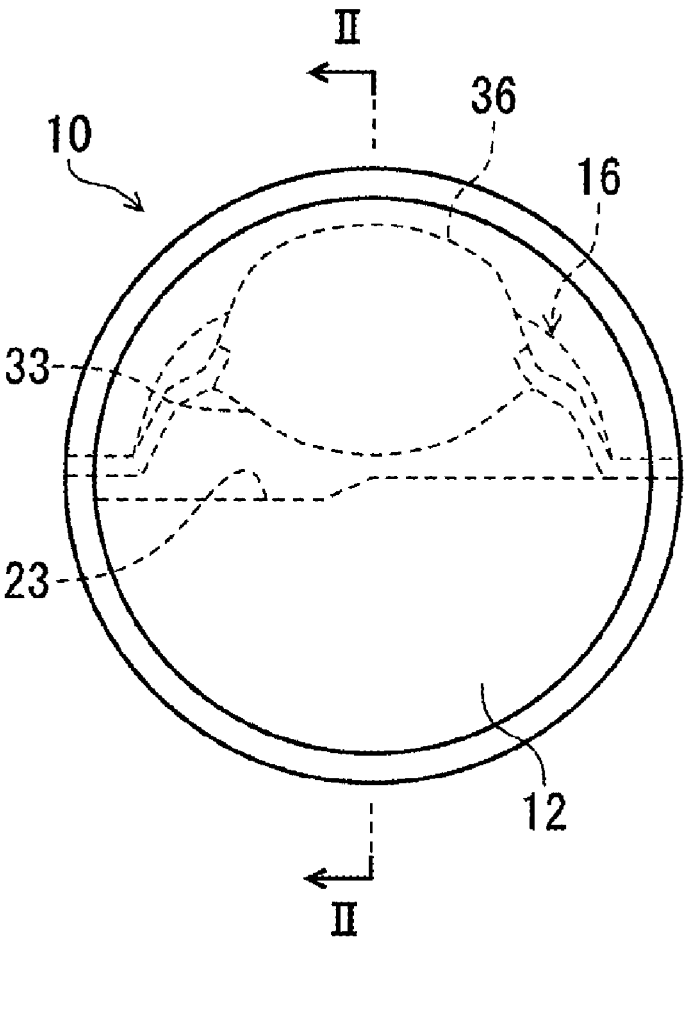
FIG. 1 is a front view of a lamp unit according to an exemplary embodiment of the invention.
Figure 2:
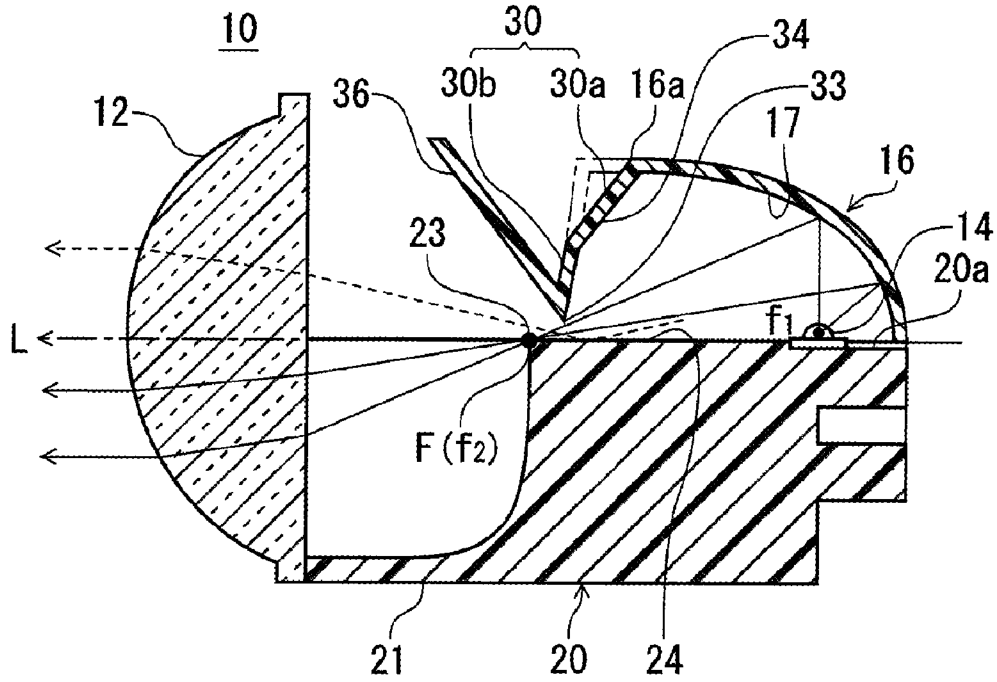
FIG. 2 is a vertical sectional view of the lamp unit taken along the line II-II in FIG. 1.

FIGS. 1 and 2 illustrate a lamp unit 10 according to an exemplary embodiment of the invention. The lamp unit 10 is configured to produce a low beam and is adapted to be incorporated into a vehicle headlamp. The lamp unit 10 includes a projection lens 12 disposed on an optical axis L extending in a front-rear direction of a vehicle, a light emitting device 14 (a light source) disposed behind the rear focal point F of the projection lens 12 such that a light emitting axis of the light emitting device 14 is oriented upward, a reflector 16 disposed to cover the light emitting device 14 from above and to forwardly reflect light emitted from the light emitting device 14 toward the optical axis L, and a first shade 20 which is made of metal and configured to form a clear cutoff line.

The projection lens 12 is a plano-convex aspherical lens having a convex front surface and a flat rear surface. The projection lens 12 projects a light source image, which is formed on the rear focal plane (i.e., a focal plane including the rear focal point F), as an inverted image onto a virtual vertical light distribution screen disposed ahead of the lamp unit 10. The projection lens 12 is firmly fixed to a forwardly extended portion 21 of a lower part of the first shade 20, and is disposed such that a light cutting edge 23 of the first shade 20 substantially coincides with the rear focal point F of the projection lens 12.

The light emitting device 14 is a light source having a light emitting chip which emits light substantially in a spot manner, and is not limited to a specific type. For example, the light emitting device 14 is an LED or a laser diode.

According to this exemplary embodiment, the light emitting device 14 is a high intensity white LED. The light emitting device 14 is positioned and fixed on a light source support portion 20*a* of the first shade 20 such that the light emitting direction is oriented upward. Luminous flux of the light emitting device 14 is, for example, about 400 lumens or more, which is several times as high as that of a generally used white LED, luminous flux of which is about 50 lumens.

The reflecting surface 17 of the reflector 16 is formed as a curved surface of an elliptic shape having a first focal point f1 at a light emitting center of the light emitting device 14, and eccentricity of the reflecting surface 17 gradually increases from the vertical cross-section to the horizontal cross-section of the reflecting surface 17. The reflector 16 is firmly fixed to a rear end portion of the upper surface of the first shade 20 such that the reflector 16 covers the light emitting device 14 from above. The reflecting surface 17 converges the light emitted from the light emitting device 14 to the rear focal point F of the projection lens 12 in the vertical cross-section and to a position in front of the rear focal point Fin the horizontal cross-section. That is, the vertical cross-section of the reflecting surface 17 of the reflector 16 includes a partial ellipse having the first focal point f1 at the light emitting center of the light emitting device 14 and the second focal point f2 at the rear focal point F of the projection lens 12.

Figure 4A:
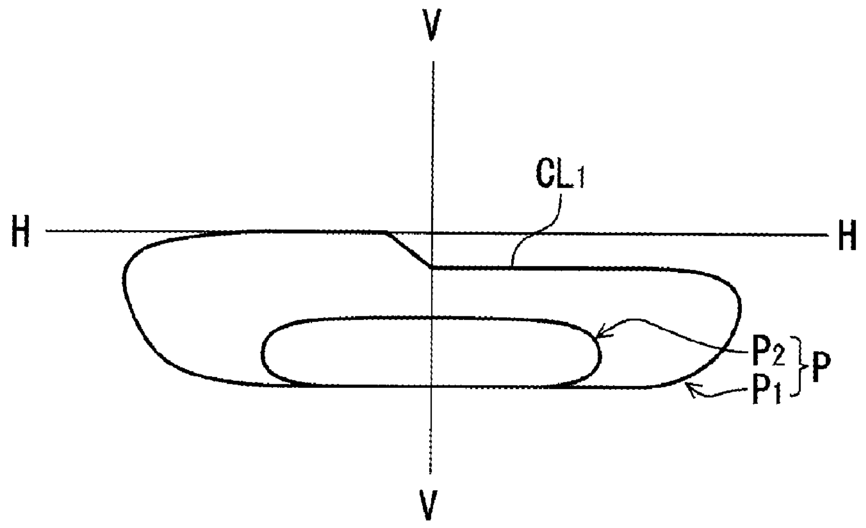
FIG. 4A is a diagram illustrating a light distribution pattern formed by the lamp unit from which a second shade is removed.

As shown in FIG. 4A, the light reflected by the reflector 16 forms a first light distribution pattern P1 having a clear cutoff line CL along its upper edge.

The light cutting edge 23 of the first shade 20 forms the clear cutoff line of the first light distribution pattern P1. The first shade 20 has an auxiliary reflecting surface 24 extending horizontally rearward from the light cutting edge 23 in the direction of the optical axis L. The auxiliary reflecting surface 24 reflects a part of the light reflected by the reflector 16 toward the projection lens 12 to form a second light distribution pattern P2, which is smaller than the first light distribution pattern P1, such that the light distribution patterns P1, P2 are combined to form a light distribution pattern P as shown in FIG. 4A. The second light distribution pattern P2 serves to increase illuminance of the light distribution pattern P.

The lamp unit 10 further includes a second shade 30 extending from a front edge 16*a* of the reflector 16 toward the auxiliary reflecting surface 24 below the second shade 30. The reflector 16 and the second shade 30 may be formed as a one-piece structure. The second shade 30 blocks a part of the light reflected by the reflector 16 and the auxiliary reflecting surface 24 toward the projection lens 12, so that an excessive increase in the illuminance in a lower portion of the light distribution pattern P can be prevented.

That is, while the light distribution pattern P2 formed by the light reflected by the auxiliary reflecting surface 24 is combined with the light distribution pattern P1 formed by the light reflected by the reflector 16 to increase the illuminance of the light distribution pattern P as a whole as shown in FIG. 4A, the illuminance in the lower portion of the light distribution pattern P may become excessively high (i.e., a part of the irradiation region close to the vehicle may become excessively bright) due to the high intensity light emitting device 14 having high luminous flux, which may cause difficulty in observing a region distant from the vehicle (i.e. may lower the visibility in the distant region).

Figure 4B:
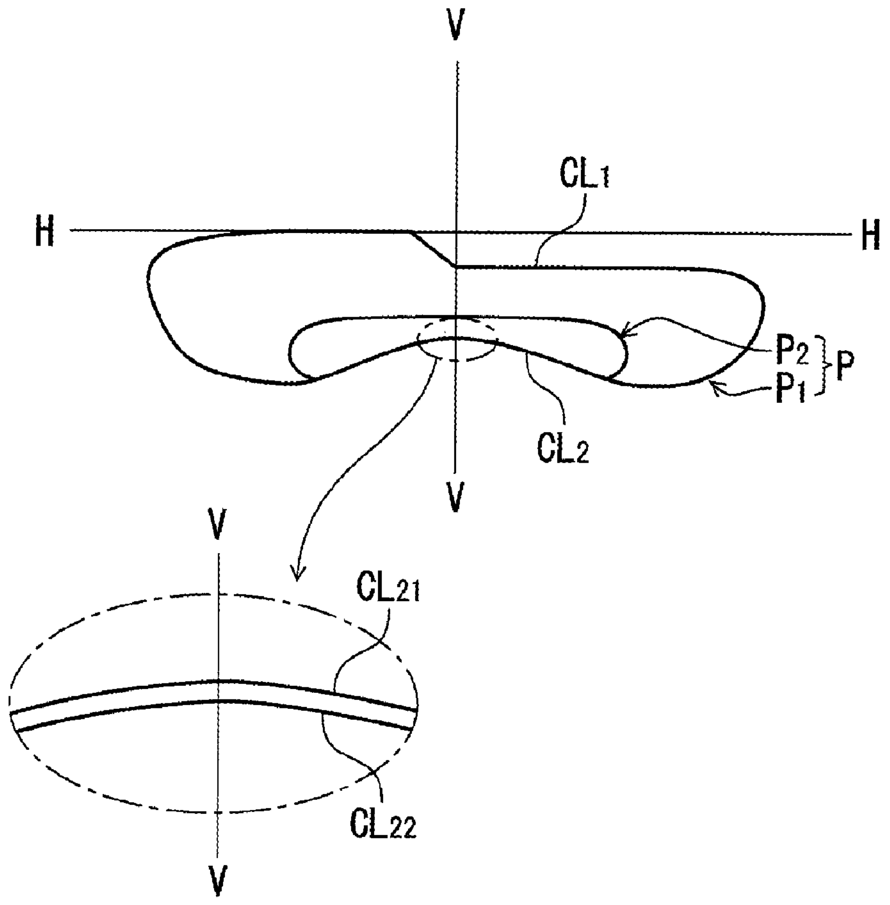
FIG. 4B a diagram illustrating a light distribution pattern formed by the lamp unit having the second shade.
Figure 5:
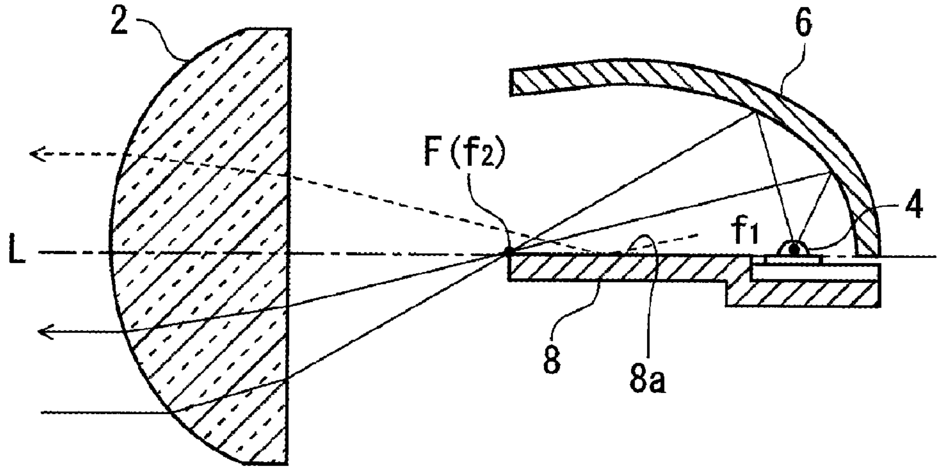
FIG. 5 PRIOR ART
FIG. 5 is a vertical sectional view of a related art lamp unit.

Therefore, the second shade 30 provided on the front edge 16*a* of the reflector 16 to block a part of the light reflected by the reflector 16 and the auxiliary reflecting surface 24 toward the projection lens 12, thereby suppressing an excessive increase in the illuminance in the lower portion of the light distribution pattern P. Thus, the part of the irradiation region close to the vehicle is prevented from becoming excessively bright, so that the visibility in the distant region is ensured. More specifically, as shown in FIG. 4B, the second shade 30 forms a cutoff line CL2, which corresponds to the shape of the second shade 30, along a lower edge of the light distribution pattern P.

Accordingly, while the light emitting device 14 having high luminous flux improves the illuminance of the light distribution pattern P, brightness of the lower portion of the light distribution pattern P is suppressed to an appropriate level. Therefore, forward visibility in a region close to a vehicle as well as in a region distant from the vehicle is improved as a whole.

As shown in FIG. 2, the second shade 30 has a light cutting edge 33 configured to form the cutoff line CL2 of the light distribution pattern P. The light cutting edge 33 is disposed at a position rearwardly shifted from the light cutting edge 23 of the first shade 20 in the direction of the optical axis L (for example, by about 3.0 mm). Therefore, the lower cutoff line CL2 of the light distribution pattern P is blurred, and the visibility in the region close to the vehicle is improved accordingly.

That is, if the light cutting edge 33 of the second shade 30 and the light cutting edge 23 of the first shade 20 coincide with each other with respect to the position along the direction of the optical axis L, a cutoff line CL21 formed by blocking, with the second shade 30, a part of the light which has been reflected only by the reflector 16, and a cutoff line CL22 formed by blocking, with the second shade 30, a part of the light which has been reflected by the reflector 16 and the auxiliary reflecting surface 24 coincide with other in the vertical direction on the light distribution screen. Therefore, the resulting cutoff line CL2 along the lower edge of the light distribution pattern P becomes clear. In other words, when the cutoff lines CL21, CL22 coincide with each other in the vertical direction, and the region shielded by the second shade 30 appears as a clear shadow below the light distribution pattern P to form a clear bright-dark border along the lower edge of the light distribution pattern P, the visibility in the part of the irradiation region close to the vehicle may be lowered.

Thus, according to the exemplary embodiment, firstly, the light cutting edge 33 of the second shade 30 and the light cutting edge 23 of the first shade 20 are shifted from each with respect to direction of the optical axis L. In other words, the light cutting edge 33 is disposed in front of or behind the light cutting edge 23 of the first shade 20 with respect to direction of the optical axis L. As a result, the cutoff lines CL21, CL22 are shifted from each other in the vertical direction so that the bright-dark border of the lower portion of the light distribution pattern P is bluffed. More specifically, the brightness of the bright-dark border varies gradually, and the region shielded by the second shade 30 does appear as a clear shadow. Therefore, the visibility in the part of the irradiation region close to the vehicle is suppressed from being lowered.

The light cutting edge 33 of the second shade 30 may shifted forward (i.e. toward the projection lens 12) from the light cutting edge 23 of the first shade 20 to achieve the effect described above. However, it is more advantageous to shift the light cutting edge 33 of the second shade 30 rearward (i.e. toward the light emitting device 14) from the light cutting edge 23 of the first shade 20.

Therefore, according to the exemplary embodiment, secondly, the light cutting edge 33 of the second shade 30 is rearwardly shifted from the light cutting edge 23 of the first shade 20 with respect to the direction of the optical axis L. In other words, the light cutting edge 33 is disposed behind the light cutting edge 23 of the first shade 20 with respect to the direction of the optical axis L. According to this configuration, as shown in FIG. 4B in an enlarged manner, the cutoff line CL21 is formed on an inner side of (i.e. above) the cutoff line CL22. As described above, the cutoff line CL21 is formed by blocking, with the second shade 30, a part of the light which has been reflected only by the reflector 16, and the cutoff line CL22 is formed by blocking, with the second shade 30, a part of the light which has been reflected by the reflector 16 and the auxiliary reflecting surface 24. The light which has been reflected only once has a higher luminous density than the light which has been reflected twice. Therefore, sharpness of the cutoff line CL 21 higher than that of the cutoff line 22 which is formed below the cutoff line CL21. Consequently, the sharpness of the bright-dark border along a lower edge of the light distribution pattern P is gradually decreased, whereby the visibility in the part of the irradiation region close to the vehicle is further improved.

Figure 3:
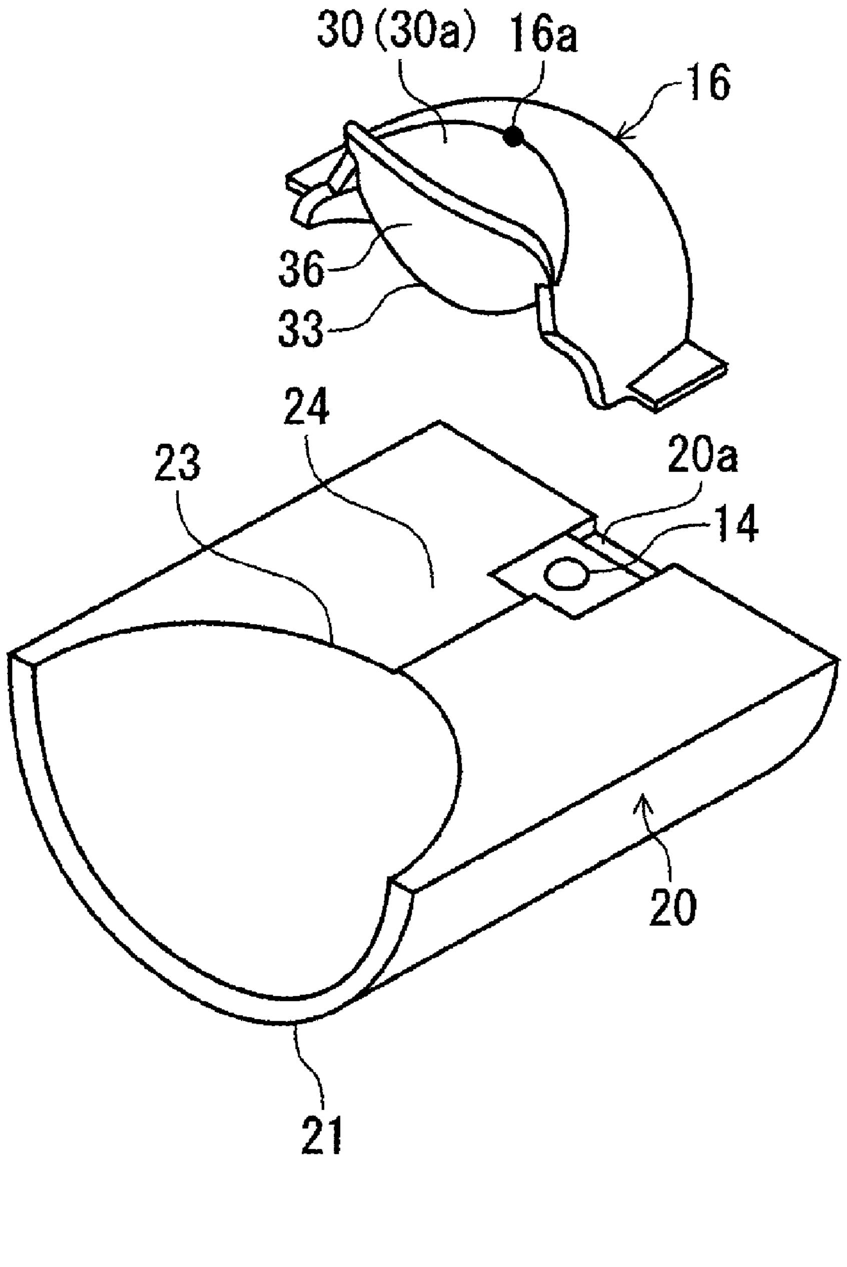
FIG. 3 is an exploded perspective view of a first shade and a reflector of the lump unit.

Thirdly, as shown in FIGS. 1 and 3, the light cutting edge 33 of the second shade 30 is formed in an arcuate shape which is downwardly convex toward the auxiliary reflecting surface 24. Therefore, the lower cutoff line CL2 of the light distribution pattern P is formed correspondingly in an arcuate shape which is upwardly convex (i.e. inwardly convex with respect to the light distribution pattern P). As a result, the illuminance of the lower portion of the light distribution pattern P is lowered in the central part thereof, thereby improving the lateral visibility as well.

Fourthly, if the section of the light cutting edge 33 of the second shade 30 is curved or rectangular, a light concentrated portion is formed along the cutoff line CL2 of the lower portion of the light distribution pattern P due to the light reflected by the curved or rectangular end face of the second shade 30, and visibility is lowered. However, according to the exemplary embodiment, the light cutting edge 33 of the second shade 30 is sharp as shown in FIG. 2. Therefore, such a light concentrated portion along the cutoff line CL2 is prevented, and ensures good visibility.

The second shade 30 has a textured surface 34 on a side facing the reflector 16, thereby preventing a glare from being radiated from the lamp unit 10.

That is, a part of the light emitted from the light emitting device 14, reflected by the reflector 16 and the second shade 30, and further reflected by the reflector 16 may be sent out from the lamp unit 10 in an unexpected direction and may cause a glare. However, the light incident on the second shade 30 is reflected by the textured surface 34 and is scattered to lower the luminous density such that, even when the light is sent out in an unexpected direction from the lamp unit 10, a glare to oncoming vehicles and pedestrians is prevented.

As shown in FIG. 2, the second shade 30 is configured to extend obliquely downward and forward, and has a bent vertical cross-section. More specifically, the second shade 30 is configured such that a part of the light reflected by the second shade 30 is further reflected at least once by the reflector 16 or the auxiliary reflecting surface 24 and is directed toward the projection lens 12 through a space between the shade 30 and the auxiliary reflecting surface 24.

Therefore, while the light reflected by the second shade 30 becomes a scattered light having a low luminous density, a part of the light is utilized to form the light distribution pattern. Therefore, the light emitted from the light emitting device 14 is efficiently used for light distribution by the lamp unit 10.

As shown by a two-dot chain line in FIG. 2, the second shade 30 may be configured such that the front edge 16*a* of the reflector 16 is extended forward and the second shade 30 is extended directly below this front edge 16*a*. However, according to the exemplary embodiment, the second shade 30 is configured in a bent manner extending obliquely downward and forward. More specifically, the second shade 30 has a base portion 30*a* extending form the front edge 16*a* of the reflector 16 and a distal portion 30*b* extending from the base portion 30*a* such that the distal portion forms a larger inclination angle with respect to the horizontal direction than the base portion 30*a*. This configuration saves quantity of resin material required for forming the reflector 16 and the second shade 30 and, moreover, makes it easier to detach the molded structure from a mold.

The lamp unit 10 may further include a dummy reflector 36 between the projection lens 12 and the second shade 30. More specifically, the dummy reflector 36 may be configured to extend upward from the light cutting edge 33 of the second shade 30, and may be formed as a part of the one-piece structure together with the reflector 16 and the second shade 30. When the lamp unit 10 is viewed from the front when it is not turned on, due to an external light entering into the lamp unit 10, the auxiliary reflecting surface 24 and the dummy reflector 36 look lustrous in a metallic color through the projection lens 12. Accordingly, outer appearance of the lamp unit 10 is improved.

The dummy reflector 36 may configured to curve so as to have a convex front surface. According to this configuration, even when the lamp unit 10 is obliquely viewed from a position shifted right or left from a position directly in front of the lamp unit 10, the dummy reflector 36 looks lustrous in a metallic color through the projection lens 12.

While the light emitting device 14 according to the exemplary embodiment described above is a high intensity white LED having a luminous flux of 400 lumens or more, the light emitting device 14 is not limited thereto. For example, the light emitting device 14 can be a high intensity white LED having a luminous flux of 200 lumens or more.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. A lamp unit for a vehicle headlamp, the lamp unit comprising:

a projection lens having an optical axis configured to extend in a front-rear direction of the vehicle;

a light emitting device disposed behind a rear focal point of the projection lens such that a light emitting axis of the light emitting device is oriented substantially orthogonal to the optical axis of the projection lens;

a reflector disposed to cover light emitted from the light emitting device and to reflect the light toward the projection lens;

a first shade configured and disposed to partially block the light reflected by the reflector;

the first shade comprising:

a first light cutting edge configured to form a first cutoff line along an upper edge of a light distribution pattern; and an auxiliary reflecting surface extending from the first light cutting edge towards the light emitting device in a direction of the optical axis and configured to partially reflect, toward the projection lens, the light reflected by the reflector; and a second shade arranged to extend from a front edge of the reflector toward the auxiliary reflecting surface.

2. The lamp unit according to claim 1, wherein the second shade comprises a textured surface on a side facing the reflector.

3. The lamp unit according to claim 1, wherein the second shade is configured and disposed such that a part of the light emitted from the light emitting device and reflected by the second shade is further reflected by at least one of the reflector and the auxiliary reflecting surface toward the projection lens through a space between the second shade and the auxiliary reflecting surface.

4. The lamp unit according to claim 1, wherein the second shade comprises:

a base portion extending from the front edge of the reflector; and a distal portion extending from the base portion at an angle with the base portion.

5. The lamp unit according to claim 1, wherein the reflector and the second shade are formed as a one-piece structure.

6. The lamp unit according to claim 1, wherein a luminous flux of the light emitting device is 200 lumens or more.

7. The lamp unit according to claim 6, wherein the luminous flux of the light emitting device is 400 lumens or more.

8. The lamp unit according to claim 1, further comprising a dummy reflector disposed between the projection lens and the second shade.

9. The lamp unit according to claim 8, wherein the dummy reflector is arranged to extend upward from the second shade.

10. The lamp unit according to claim 9, wherein the reflector, the second shade, and the dummy reflector are formed as a one-piece structure.

11. The lamp unit according to claim 1, wherein the second shade comprises a second light cutting edge configured to form a second cutoff line along a lower edge of the light distribution pattern.

12. The lamp unit according to claim 11, wherein the second light cutting edge is convex toward the auxiliary reflecting surface.

13. The lamp unit according to claim 11, wherein the second light cutting edge is disposed in front of or behind the first light cutting edge in the direction of the optical axis.

14. The lamp unit according to claim 13, wherein the second light cutting edge is disposed behind the first light cutting edge in the direction of the optical axis.

* * * * *